United States Patent [19]

Cotter et al.

[11] 4,003,848

[45] Jan. 18, 1977

[54] METHOD FOR THE ADSORPTION OF SULFUR DIOXIDE

[75] Inventors: Robert James Cotter, Bernardsville; Michael John Keogh, Somerville; William Donald Heitz, Flagtown, all of N.J.

[73] Assignee: Union Carbide Corporation, New York, N.Y.

[22] Filed: Feb. 9, 1976

[21] Appl. No.: 656,256

Related U.S. Application Data

[60] Continuation-in-part of Ser. No. 531,398, Dec. 10, 1974, abandoned, which is a division of Ser. No. 489,126, July 17, 1974, Pat. No. 3,876,395, which is a continuation-in-part of Ser. No. 448,999, March 7, 1974, abandoned.

[52] U.S. Cl. .............................. 252/427; 252/430; 252/428; 55/73; 55/74; 427/386; 252/426
[51] Int. Cl.² .................. B01J 31/02; B01D 39/00; B01D 53/02

[58] Field of Search .................. 55/73, 74; 210/54; 427/386; 252/426, 427, 428, 430

[56] References Cited

UNITED STATES PATENTS

| 3,498,026 | 3/1970 | Messinger et al. .................. 55/73 |
| 3,780,500 | 12/1973 | Clemens et al. ........................ 55/73 |
| 3,793,434 | 2/1974 | Leder ............................... 423/223 |

*Primary Examiner*—Patrick P. Garvin
*Assistant Examiner*—William G. Wright
*Attorney, Agent, or Firm*—Bernard F. Crowe

[57] ABSTRACT

Sulfur dioxide can be adsorbed from gas mixtures using cross-linked, water-insoluble polymers of N-glycidyl piperazine or N-glycidyl polyalkylpiperazines as the adsorbents.

30 Claims, No Drawings

METHOD FOR THE ADSORPTION OF SULFUR DIOXIDE

This is continuation-in-part of Ser. No. 531,398 filed Dec. 10, 1974, now abandoned, which is a division of Ser. No. 489,126 filed July 17, 1974, now U.S. Pat. No. 3,876,395, which in turn is a continuation-in-part of Ser. No. 448,999 filed Mar. 7, 1974, now abandoned.

BACKGROUND OF THE INVENTION

This invention pertains to the adsorption of $SO_2$ from gas mixtures and in particular to the use of crosslinked polymers of N-glycidylpiperazine or N-glycidyl polyalkylpiperazines as the adsorbents.

Power plant gas effluents as well as other industrial waste gases contribute to the general environmental air pollution problems extant. One of the six chief air pollutants, $SO_2$, is a common component of these waste gases. In the past many methods have been used in attempts to reduce $SO_2$ air pollution by control at its source, but none are being practiced widely in attempts to consistently meet the National Air Quality Standards which call for a maximum of 0.14 parts per million (ppm) of $SO_2$ for a 24 hour period. Alkaline water scrubbing, ammonia scrubbing, and limestone scrubbing are examples of limited solutions to this problem. Similarly, effective means for removing $SO_2$ from ambient air, especially within buildings and homes, are not available. Since people spend about 80% of their lives indoors, control of pollutant concentrations that they actually come into contact with represents another approach to solving air pollution problems.

It is an object of this invention to provide a method of $SO_2$ adsorption from gas mixtures, including ambient indoor and outdoor air, which is selective for $SO_2$. For example, $CO_2$ is present in stack gases in much larger quantities than $SO_2$ and its adsorption is undesirable.

Another object of this invention is to provide an adsorbent with a high capacity for $SO_2$ adsorption which is chemically stable, water-insoluble and which is readily regenerated.

SUMMARY OF THE INVENTION

The above objects have been satisfied by a method which comprises contacting gas mixtures containing sulfur dioxide and moisture with a crosslinked, water-insoluble polymer of N-glycidylpiperazine or N-glycidyl polyalkylpiperazines at a temperature of about −10° to about 100° C. Although about 5% by weight of $SO_2$ will be removed from dry gas mixtures, it is preferred for efficient $SO_2$ removal that the gas mixtures contain at least 0.1% by weight of water vapor. For optimum $SO_2$ removal efficiency it is preferred that the gas mixture contain from about 0.7 to about 1.5% by weight of water vapor.

The adsorbent may be used in the form of porous particles of the N-glycidylpiperazine polymer or the N-glycidylpiperazine polymer may be deposited on a support, preferably one having a high surface area. This may be readily accomplished by taking an aqueous solution of N-glycidylpiperazine oligomer, immersing a support as for example, porous polyurethane open cell foam, in the aqueous oligomer solution, removing the excess solution from the pores of the foam, and thermally curing the coatings to a water-insoluble, crosslinked polymer on the surface of the foam. The nature of the support is not critical and so myriad materials may be used, as for example, industrial filter paper, glass fiber matting, plastic mesh screens, composites of wood-flour/poly(ethylene oxide) (e.g., 50:50 by wt.), porous siliceous materials such as clay, macroreticular polystyrene beads, $\alpha$ or $\gamma$-alumina, asbestos, sisal, macroreticular ion exchange resins, vermiculite, natural and synthetic mordenite, diatomaceous earth and the like.

A method of making N-glycidylpiperazine has been described in U.S. Pat. No. 2,963,483 by D. L. Heywood. Homologs are obtained, when e.g., 2,5-dimethylpiperazine or 2,6-dimethylpiperazine are substituted for piperazine itself.

The oligomer of these N-glycidylpiperazine compounds having the structure:

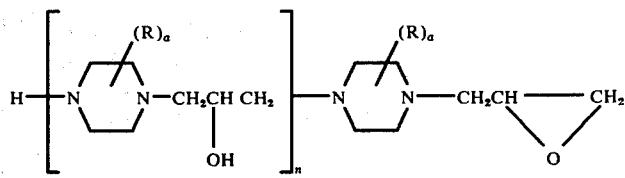

wherein each R is a lower alkyl group having up to about 8 carbon atoms, $a$ is an integer having values of 0 to 4, and $n$ is an integer having values of about 2 to about 20, can be prepared by interpolymerizing piperazine or a polyalkylpiperazine with epichlorohydrin under controlled conditions.

As an extension of this work the diglycidyl ether of Bisphenol A (2,2-bis(p-hydroxyphenyl)propane) was interpolymerized with piperazine to afford a polymer having the repeating unit shown below.

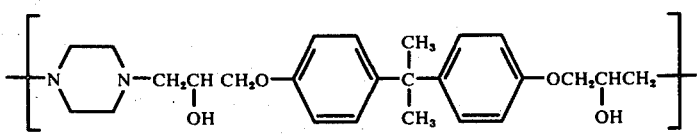

The adsorbents of this invention possess the added benefit of adsorbing $SO_2$ preferentially over $CO_2$. This selectivity is achieved in conjunction with a high capacity for the adsorption of $SO_2$. The adsorbents of this invention are also chemically stable and easily regenerated by raising the temperature of its surroundings to a temperature of about 60° to about 160° C.

The paradoxical overlap of adsorption and desorption temperatures is reconcilable by virtue of the fact that the adsorptive capacity of these polymers decreases with increase of temperature. Thus, if the $SO_2$ adsorption process is carried out at a low temperature, as for example 20° C., until the adsorbent is saturated and the temperature is then raised to say 60° C., some of the $SO_2$ adsorbed will be desorbed until the saturation level of the adsorbent at that temperature is reached. If the temperature is further raised to above about 110° C., essentially all of the adsorbed $SO_2$ will be desorbed.

The desorbed $SO_2$ may be converted to liquid $SO_2$, sulfur or other useful by-products. Regeneration may also be effected by contacting the adsorbent with a base such as an alkali metal hydroxide, alkaline earth hydroxide, or an alkali metal alkoxide having 1 to about 4 carbon atoms and the like.

The N-glycidylpiperazine polymers used as adsorbents in this invention are mechanically stable as are the articles fabricated by depositing the adsorbents on suitable substrates.

The mechanism of adsorption of $SO_2$ by the N-glycidylpiperazine polymers of this invention may take place either by charge transfer or by ionic complexation. In the former case, anhydrous $SO_2$ and the tertiary amine moiety of the polymer form a Lewis acid-base complex as shown below:

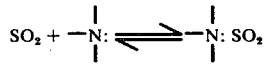

Unlike the charge transfer mechanism, $SO_2$ adsorption by ionic complexation will occur best when the gas contains some moisture. This mechanism involves formation of sulfite or bisulfite ions that complex with the amine as shown below:

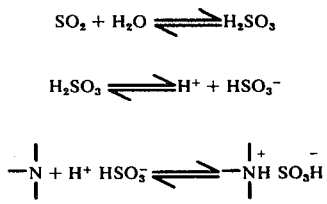

The evaluation of various $SO_2$ adsorbent systems was conducted with apparatus constructed specifically for that purpose. The system was composed of a gas metering, device and an $SO_2$ monitor. In operation, the monitor was first calibrated with a gas containing a standardized concentration of $SO_2$. Once this calibration had been completed, the adsorbents were tested by inserting a test specimen in the gas line before the monitor and observing the registered change in the $SO_2$ concentration of the effluent gas stream.

The calibration gases were either drawn from a cylinder or generated by $SO_2$ permeation tubes prepared by the National Bureau of Standards to emit a constant weight of $SO_2$ at a specified temperature. The cylinders of gas were used when high $SO_2$ concentrations were required whereas permeation tubes were used for low $SO_2$ concentrations i.e., in the range of 0.5 to 5.0 ppm (parts per million). Authentic, ambient air was used to evaluate these adsorbents for their effectiveness in removing the $SO_2$ therein, i.e, in the range of 0.01–0.2 ppm. $SO_2$ concentrations were measured with a Dynasciences monitor and a continuous, colorimetric method based on the West-Gaeke method for $SO_2$ analysis.

The preparation of crosslinked, poly(N-glycidylpiperazine) can be effected by carrying out the polymerization of N-glycidylpiperazine oligomer followed by a crosslinking operation at a temperature of about 80° to 180° C. in situ. Thus, for example, a suspension of 5 weight per cent N-glycidylpiperazine oligomer in n-heptane can be heated at reflux, i.e., 98.4° C. to effect polymerization, followed by crosslinking. The initially insoluble oligomer is directly converted to particulate polymer without any evidence of dissolution and reprecipitation. After a reflux time in n-heptane as short as four hours, the polymer obtained is swollen by but is insoluble in water. Longer reaction times result in increasing the degree of crosslinking as evidenced by a lower degree of swelling in water. The organic liquid used for the polymerization is not critical and thus an aromatic liquid, such as xylene, which boils at 140° C. also serves for the polymerization and subsequent crosslinking of N-glycidylpiperazine oligomer. Yields of crosslinked poly(N-glycidylpiperazine) are essentially quantitative.

The particle size of the crosslinked poly-(N-glycidylpiperazine) can be controlled by regulating the degree of stirring. Thus, for example, rapid stirring during the polymerization affords polymer particles which pass through a fifty mesh screen. Under less vigorous stirring conditions, polymer particles averaging ⅛ of an inch in diameter were obtained. With moderate stirring a mixture of fine and coarse particles can be produced. Crosslinked poly(N-glycidylpiperazine) prepared in both n-heptane and xylene was examined under a scanning electron miscroscope. The porous nature of the polymer particles obtained was readily apparent as well as the similarity of the two polymers produced in the two solvents. The miscroscopic morphology of these polymers was that of plate-like crystals. In preparing polymer adsorbents of this invention on supports, it is convenient to apply the polymer as an aqueous solution and heat to a temperature of about 100° to 180° C.

For commercial scale $SO_2$ removal operations, a variety of fabricated filter elements, such as honeycombs, corrugations, cylinders, meshes, fibrous panels, etc. can be employed. These can be tailor-made to be fitted in pipes, conduits, chimney-stacks and the like. They can be designed for use in a static, or fixed bed mode, or in a dynamic, moving bed mode of operation.

The invention is further described in the examples which follow.

All parts and percentages are by weight unless otherwise specified.

EXAMPLE 1

PREPARATION OF N-GLYCIDYLPIPERAZINE OLIGOMER

Piperazine (86.15 g., one mole) and ethanol (150 g. plus 1.5 g. water) were placed in a one liter 3-neck flask equipped with a stirrer, thermometer, dropping funnel and condenser. The mixture was stirred until a complete solution was obtained and then epichlorohydrin (92.53 g., one mole) was added dropwise while maintaining the temperature below 25° C., by means of an ice bath. After addition of the epichlorohydrin was complete, the temperature was maintained below 25° C. for an additional 30 minutes. Then a solution of 56.11 g. (1 mole) of potassium hydroxide in 225 g. of ethanol was added over a period of 30 minutes while maintaining the temperature below 25° C. After cooling to 15° C. the potassium chloride which had formed during the reaction was filtered from the mixture and the filtrate concentrated to ½ its volume by stripping under vacuum. One liter of ethyl acetate was then added to the residual filtrate. The N-glycidylpiperazine oligomer precipitated as a white solid. The resultant slurry was filtered after standing several hours. The N-glycidylpiperazine oligomer collected on the filter after drying in vacuo at room temperature amounted to 119 grams, 83.8% of the theoretical yield. Elemental analysis indicated: %C, 56.09; %H, 9.55; %N, 18.55; %O 15.77. The number average molecular weight as determined by vapor pressure osmometry was 705. This data corresponds to the formula:

EXAMPLE 3

PREPARATION OF POLYURETHANE FOAM COATED WITH CROSSLINKED POLY(N-GLYCIDYLPIPERAZINE)

Six specimens measuring one inch thick by three inches by four inches were cut from open-cell polyurethane foam supplied by Paramount Industries, having a porosity of forty-five pores per linear inch and a bulk density of about two pounds per cubic foot. The specimens were immersed in a bath of twenty weight percent aqueous solution of N-glycidylpiperazine oligomer for ten minutes. The specimens were then taken out of the bath and the excess solution removed from the foam pores by placing the specimens on a Buchner funnel under vacuum, and covered with a rubber dam at a pressure of fifteen inches of mercury. The specimens were then placed in an oven at 100° C. for sixteen hours. This effected the curing or polymerization of the N-glycidylpiperazine oligomer to a crosslinked, insoluble polymer on the surface of the polyurethane foam.

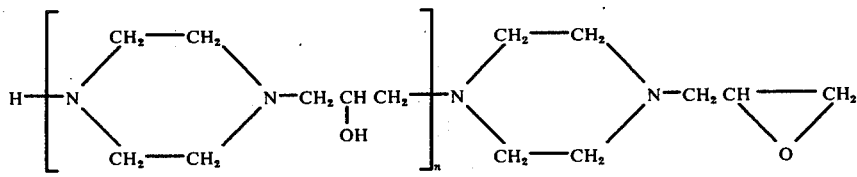

EXAMPLE 2

POLYMERIZATION AND CROSSLINKING OF N-GLYCIDYLPIPERAZINE OLIGOMER

Fifty grams of N-glycidylpiperazine oligomer prepared as in Example 1 was charged to a resin kettle equipped with stirrer, reflux condenser, thermometer and heater together with 950 g. of n-heptane. The mixture was heated with stirring for seven hours at a reflux temperature of about 98° C. Filtration of the reaction mixture afforded 49.05 g. of particulate, porous, crosslinked, water insoluble, poly(N-glycidylpiperazine). This polymer was found to have a surface area of 7.0 square meters per gram when measured in accordance with the standard BET nitrogen absorption test which is described in "Surface and Colloid Science" Vol. 2 pg. 85–89 Wiley-Interscience, NYC 1969. This material having an average particle size of less than 50 mesh was particularly useful in preparing articles for adsorption of $SO_2$ from moist gas streams containing $SO_2$. These articles were fabricated by first immersing fluted Whatman filter paper in a 20% aqueous solution of N-glycidylpiperazine oligomer and then powder coating the paper with the porous, particulate, water insoluble poly(N-glycidylpiperazine) obtained above. This was then heated to 130° C. for about 2 hours which caused the oligomer to polymerize, cross-link and bond to the particulate poly(N-glycidylpiperazine). The resultant articles when exposed to a nitrogen gas stream containing 3000 ppm or 0.3% of $SO_2$ and 1.2% $H_2O$ adsorbed 45% by weight of $SO_2$ based on the polymer weight and reduced the $SO_2$ content of the gas stream to about 30 ppm.

The polymeric coatings comprised 19 weight percent of each specimen. For evaluating the efficacy of the coated polyurethane foams as to adsorption, smaller specimens 1 inch long were cut from the 6 specimens described above with a ¼ inch cork borer and then mounted in ¼ inch I.D. Teflon columns. These columns were placed in the $SO_2$ adsorption apparatus described earlier and a test mixture of nitrogen containing 1.2 ppm of $SO_2$ was passed through the apparatus at a space velocity of 3,400 hr.$^{-1}$. The gas stream was humidified to contain 1.2 percent water and the temperature of the test chamber being 30° C. The effluent gas analyzed with the $SO_2$ Dynasciences analyzer was found to contain less than 0.05 ppm of $SO_2$.

This experiment was repeated at a space velocity of 12,400 hr.$^{-1}$ and the effluent gas was shown to contain 0.09 ppm. of $SO_2$.

This experiment was repeated again at a space velocity of 20,000 hr.$^{-1}$. The effluent gas contained 0.21 ppm of $SO_2$.

Space velocity as used in this invention is defined as:

$$\text{Space velocity} = \frac{\text{flow rate of gas (ml./min)} \times 60}{\begin{pmatrix} \text{total volume} \\ \text{of adsorbent} \\ \text{sample in ad-} \\ \text{sorption tube} \\ \text{(ml.)} \end{pmatrix} - \begin{pmatrix} \text{weight of} \\ \text{adsorbent in} \\ \text{grams assum-} \\ \text{ing a density} \\ \text{of 1} \end{pmatrix}}$$

EXAMPLE 3A

ADSORPTION OF SO$_2$ FROM AMBIENT AIR BY POLYURETHANE FOAM COATED WITH CROSSLINKED POLY(N-GLYCIDYLPIPERAZINE)

A foam filter was prepared by placing poly(N-glycidylpiperazine)-coated, open cell, polyurethane foam as prepared and described in Example 3) in a tube of shrinkable Teflon tubing that was fitted with end connectors of glass tubing. The foam plug containing 20.3% (by weight) of poly(N-glycidylpiperazine) and measuring 2 inches long × ¼ inch in diameter weighed 0.0834 grams. Ambient air (moisturized to 80–95% relative humidity) was passed through this foam filter at a rate of 600 cc/min. and the effluent monitored for SO$_2$ by means of a West-Gaeke continuous colorimetric method. Throughout this Example which was terminated voluntarily after 4 days (96 hours), the concentration of SO$_2$ in the effluent air from the filter was less than 0.002 ppm or 2 ppb (parts per billion). Simultaneous analysis of an unfiltered, ambient air stream as a Control showed that its SO$_2$ concentration varied over the range of 0.012–0.200 ppm. Another Control employing a filter made from an uncoated plug of polyurethane foam (2 inches × ¼ inch) showed that no SO$_2$ was removed from the moisturized ambient air stream at a flow rate of 600 cc/min. These results clearly demonstrate the high efficiency of the poly(N-glycidylpiperazine) adsorbents at extremely low SO$_2$ concentrations.

EXAMPLE 4

ADSORPTION OF SO$_2$ BY A WOOD FLOUR COMPOSITE COATED WITH CROSSLINKED POLY(N-GLYCIDYLPIPERAZINE)

A particulate composite of 50 weight percent Douglas fir wood flour having a particle size of less than 20 microns and fifty weight per cent of crosslinked poly(ethylene oxide) having a molecular weight of about 600,000 was immersed in a five per cent aqueous solution of N-glycidylpiperazine oligomer and then spread in a thin layer over the bottom of a tray which was then exposed in forming a crosslinked poly(N-glycidylpiperazine) composite within the wood flour-poly(ethylene oxide) mixture. After removing water and drying the resultant composite, the particles were ground to the desired particle size and placed in one inch columns of ¼ inch i.d. Teflon tubing. These tubes were then placed in the SO$_2$ adsorption apparatus described above and used in Example 1. Nitrogen gas containing 1.2 ppm of sulphur dioxide was passed through the apparatus at a space velocity of 3,400 hr.$^{-1}$. The effluent gas contained less than 0.05 ppm of SO$_2$. In a second experiment the space velocity of the SO$_2$/N$_2$ gas mixture was 12,400 hr.$^{-1}$. The effluent gas contained 0.08 ppm of SO$_2$. In the third experiment the space velocity of the SO$_2$ containing nitrogen gas was 20,000 hr.$^{-1}$. The effluent gas contained 0.13 ppm of SO$_2$. The amount of polymeric, crosslinked N-glycidylpiperazine in the composite was 20 weight per cent. As in Example 3 the gas stream was humidified with 1.2 per cent water and the test temperature was 30° C.

EXAMPLE 5

ADSORPTION OF SO$_2$ BY PAPER COATED WITH CROSSLINKED POLY(N-GLYCIDYLPIPERAZINE)

Example 3 was repeated using Whatman filter paper coated with polymerized, crosslinked poly(N-glycidylpiperazine). The polymer was coated on to the filter paper under the same conditions as described in Example 3. The effluent gas contained less than 0.05 ppm of sulphur dioxide when the space velocity was 3,400 hr.$^{-1}$, and 0.16 ppm of SO$_2$ when the space velocity was 20,000 hr.$^{-1}$. The filter paper contained a coating of 42 percent polymer.

EXAMPLE 6

ADSORPTION OF SO$_2$ BY GLASS FIBER COATED WITH CROSSLINKED POLY(N-GLYCIDYLPIPERAZINE)

Example 4 was repeated with the exception that the N-glycidylpiperazine oligomer was coated, polymerized and crosslinked onto glass fiber instead of polyurethane foam to give a coating of 14 percent polymer. At a space velocity of 3,400 hr.$^{-1}$, the effluent gas contained 0.34 ppm of SO$_2$.

EXAMPLE 7

ADSORPTION OF SO$_2$ ON POLYPROPYLENE COATED WITH CROSSLINKED POLY(N-GLYCIDYLPIPERAZINE)

Example 4 was repeated with the exception that the N-glycidylpiperazine oligomer was coated, polymerized and crosslinked on to polypropylene fiber to give a coating of 10 percent polymer. At a space velocity of 3400 hr.$^{-1}$, the effluent gas contained 0.33 ppm of SO$_2$.

EXAMPLE 8

ADSORPTION OF SO$_2$ ON CHARCOAL COATED WITH CROSSLINKED POLY(N-GLYCIDYLPIPERAZINE)

Example 4 was repeated with the exception that charcoal was treated with N-glycidylpiperazine oligomer and heated as in Example 4 to give a deposit of crosslinked poly(N-glycidylpiperazine). At a space velocity of 3400 hr.$^{-1}$, the effluent SO$_2$ in the effluent gas stream was found to be 0.18 ppm.

EXAMPLE 9

ADSORPTION OF SO$_2$ BY SUPPORTED CROSSLINKED POLY(N-GLYCIDYLPIPERAZINE)

Equal parts by weight of $\gamma$-Al$_2$O$_3$ and N-glycidylpiperazine oligomer prepared as in Example 1 were weighed into a glass container or jar with 10 to 20 steel balls. The container was closed and rolled on a ball mill for about 2 hours. The resultant mixture was separated from the steel balls by passing it through a 50 mesh screen, the balls remaining on the screen. A Stokes 2 inch pre-form press was used to make 10 gram, 2 inch diameter pellets from the mixture with compaction densities of 39 to 55 lbs/ft.$^3$ The compacted pellets were cured, i.e., crosslinked by heating in a 120° C. vacuum oven at 29 inches of mercury for periods of about 16 hours. The cured pellets were then cooled in a dry atmosphere and ground in a Wiley mill fitted with a 4–6 mm. screen. This ground material was classified into desired particle sizes by sieving through standard U.S. Sieve Series screens having Sieve Numbers 4, 6, 8, 12, 18 and 25. These are described in the Handbook of Chemistry edited by N. A. Lange 10th Edition page 911 (1961).

The $SO_2$ adsorption characteristics of this screened mixture were determined by first packing sections of 3/16 inch diameter Teflon tubing to a length of 5 inches with said mixture. These mixtures were held in place by glass wool. The exact amount of the mixture was determined by weighing the tubing before and after packing to the nearest 0.0001 gram. The filled sections of tubing were then evaluated as adsorption columns for $SO_2$ removal. The apparatus used to determine $SO_2$ breakthrough capacities of these adsorption columns consisted of a $SO_2$ source, a flow regulator, a hydration tube for adding moisture to the gas stream, a Dynasciences $SO_2$ monitor fitted with sensors in the range of 0–500, 0–1500, and 0–5000 parts ppm. The monitor was calibrated with a gas containing 3000 ppm of $SO_2$, 14.7% $CO_2$ and 85% $N_2$. The adsorption column to be tested was then inserted before the monitor and the $SO_2$ adsorption of the adsorbent determined by observing the amount of $SO_2$ in the filtered effluent gas recorded by the monitor.

The specific test conditions used were:
Adsorption column size - 5 inch × 3/16 inch
$SO_2$ concentration in test gas - ca. 3000 ppm
Moisture content of test gas - ca. 22 mg./l.
Gas flow rate (volume) - 600 cc/min.
Gas flow rate (linear) - 6600 ft./hour The $SO_2$ adsorption characteristics were calculated as follows:

1. $$\text{Efficiency of Adsorbent (\%)} = \frac{A - B}{A} \times 100$$

where
A = $SO_2$ Concentration in the feed gas
B = $SO_2$ Concentration in the effluent gas 2. $$\text{Breakthrough Capacity} = \frac{T \times C}{W \times A} \times 100$$

(Grams of $SO_2$ adsorbed per 100 grams of adsorbent)

Where
T = Time in minutes for which no $SO_2$ is measured in the effluent gas
C = Amount of $SO_2$ in grams per minute that is collected by the adsorbent (calculated from the $SO_2$ conc. and flow rate of the test gas)
W = Weight in grams of total adsorbent in the adsorption column
A = Percentage of active adsorbent in the adsorbent.

The $SO_2$ adsorption characteristics of crosslinked poly(N-glycidylpiperazine) blended with $\gamma$-$Al_2O_3$ (gamma-alumina) at a number of particle densities, mesh sizes, and concentrations were determined in the system described immediately above. The data obtained are delineated in Table 1. Similar data were then collected for other inert supports, viz., $\alpha$-$Al_2O_3$ (alpha-alumina), diatomaceous earth, natural mordenite, synthetic mordenite, chrysotile asbestos, finely ground filter paper, macroreticular ion exchange resin, vermiculite and chopped sisal. These data are also presented in Table 1 together with one run using granular poly(N-glycidylpiperazine) with a support.

TABLE 1

Sulfur Dioxide Adsorption Characteristics For Poly(N-Glycidylpiperazine)Adsorbent Compositions

| Support | | Particle Density lbs/ft³ | Particle size (U.S. Sieve No.) | Weight of adsorbent (grams) | Column Length (inches) | $SO_2$ Conc. In Gas Stream (ppm) | Pre-Test[1] Moisture (%) | $SO_2$ Adsorption[2] Efficiency (%) | Capacity |
|---|---|---|---|---|---|---|---|---|---|
| Type | Amount | | | | | | | | |
| $\gamma$-$Al_2O_3$ | 50 | 51–55 | 8–12 | 0.9431 | 5 | 2780 | 0 | >99.5 | 11 |
| $\gamma$-$Al_2O_3$ | 50 | 51–55 | 18–25 | 0.9353 | 5 | 2780 | 0 | >99.5 | 20 |
| $\gamma$-$Al_2O_3$ | 50 | 51–55 | 18–25 | 0.8908 | 5 | 2780 | 18 | >99.5 | 35 |
| $\gamma$-$Al_2O_3$ | 50 | 51–55 | 12–18 | 0.9375 | 5 | 2780 | 0 | >99.5 | 24 |
| $\gamma$-$Al_2O_3$ | 50 | 51–55 | 8–12 | 0.9030 | 5 | 2780 | 19 | >99.5 | 11 |
| None | 0 | 42–43 | 8–12 | 0.7138 | 5 | 2780 | 23 | >99.5 | 6 |
| $\gamma$-$Al_2O_3$ | 10 | 44–45 | 8–12 | 0.7370 | 5 | 2780 | 0 | >99.5 | 11 |
| $\gamma$-$Al_2O_3$ | 20 | 45–46 | 8–12 | 0.7600 | 5 | 2780 | 0 | >99.5 | 11 |
| $\gamma$-$Al_2O_3$ | 30 | 46–47 | 8–12 | 0.7760 | 5 | 2780 | 0 | >99.5 | 13 |
| $\gamma$-$Al_2O_3$ | 40 | 49–50 | 8–12 | 0.8069 | 5 | 2780 | 0 | >99.5 | 13 |
| $\gamma$-$Al_2O_3$ | 50 | 50–51 | 8–12 | 0.8851 | 5 | 2780 | 0 | >99.5 | 16 |
| $\gamma$-$Al_2O_3$ | 10 | 44–45 | 12–18 | 0.7436 | 5 | 2780 | 0 | >99.5 | 22 |
| $\gamma$-$Al_2O_3$ | 20 | 45–46 | 12–18 | 0.7838 | 5 | 2780 | 0 | >99.5 | 23 |
| $\gamma$-$Al_2O_3$ | 30 | 46–47 | 12–18 | 0.7941 | 5 | 2780 | 0 | >99.5 | 26 |
| $\gamma$-$Al_2O_3$ | 40 | 49–50 | 12–18 | 0.7988 | 5 | 2780 | 0 | >99.5 | 28 |
| $\gamma$-$Al_2O_3$ | 50 | 50–51 | 12–18 | 0.8852 | 5 | 2780 | 0 | >99.5 | 25 |
| $\gamma$-$Al_2O_3$ | 10 | 44–45 | 18–25 | 0.7012 | 5 | 2780 | 0 | >99.5 | 28 |
| $\gamma$-$Al_2O_3$ | 20 | 45–46 | 18–25 | 0.7340 | 5 | 2780 | 0 | >99.5 | 29 |
| $\gamma$-$Al_2O_3$ | 30 | 46–47 | 18–25 | 0.7492 | 5 | 2780 | 0 | >99.5 | 30 |
| $\gamma$-$Al_2O_3$ | 40 | 49–50 | 18–25 | 0.8309 | 5 | 2780 | 0 | >99.5 | 33 |
| $\gamma$-$Al_2O_3$ | 50 | 50–51 | 18–25 | 0.8842 | 5 | 2780 | 0 | >99.5 | 39 |
| $\alpha$-$Al_2O_3$ | 20 | 47 | 8–25 | 0.9762 | 5 | 3037 | 0 | >99.5 | 10 |
| $\alpha$-$Al_2O_3$ | 40 | 63 | 8–25 | 1.2531 | 5 | 3037 | 0 | >99.5 | 10 |
| Diatomaceious Earth | 30 | 31–34 | 8–12 | 0.6648 | 5 | 3040 | 0 | >99.5 | 17 |
| Natural Mordenite | 30 | 40–41 | 8–12 | 0.7964 | 5 | 3040 | 0 | >99.5 | 11 |
| Synthetic Mordenite | 30 | 40–42 | 8–12 | 0.7742 | 5 | 3040 | 0 | >99.5 | 13 |
| Synthetic Mordenite | 30 | 40–42 | 12–18 | 0.7486 | 5 | 3040 | 0 | >99.5 | 24 |
| Diatomaceious Earth | 30 | 31–34 | 8–12 | 0.6314 | 5 | 3040 | 0 | >99.5 | 26 |
| Natural Mordenite | 30 | 40–41 | 8–12 | 0.8080 | 5 | 3040 | 0 | >99.5 | 26 |
| Asbestos | 10 | 47 | 12–18 | 0.7577 | 5 | 2780 | 0 | >99.5 | 16 |
| Asbestos Finely Ground | 20 | 48 | 18–25 | 0.7696 | 5 | 2780 | 19 | >99.5 | 18 |

4,003,848

TABLE 1-continued

Sulfur Dioxide Adsorption Characteristics For Poly (N-Glycidylpiperazine)Adsorbent Compositions

| Support | | Particle Density lbs/ft³ | Particle size (U.S. Sieve No.) | Weight of adsorbent (grams) | Column Length (inches) | SO₂ Conc. In Gas Stream (ppm) | Pre-Test[1] Moisture (%) | SO₂ Adsorption[2] Efficiency (%) | Capacity |
|---|---|---|---|---|---|---|---|---|---|
| Type | Amount | | | | | | | | |
| Filter Paper | 10 | 44–46 | 18–25 | 0.5515 | 5 | 2780 | 30 | >99.5 | 17 |
| Finely Ground Filter Paper | 20 | 46 | 18–25 | 0.5139 | 5 | 2780 | 26 | >99.5 | 27 |
| XAD-2[3] | 10 | 43–46 | 12–18 | 0.7779 | 5 | 2780 | 0 | >99.5 | 9 |
| XAD-2 | 20 | 39–40 | 12–18 | 0.7282 | 5 | 2780 | 0 | >99.5 | 14 |
| Vermiculite | 10 | 52 | 12–18 | 0.8715 | 5 | 2780 | 0 | >99.5 | 11 |
| Vermiculite | 20 | 50 | 12–18 | 0.8121 | 5 | 2780 | 0 | >99.5 | 10 |
| Chopped Sisal | 10 | 45–47 | 18–25 | 0.6451 | 5 | 2780 | 25 | >99.5 | 29 |

[1]Moisture content of adsorbent prior to passage of SO₂ containing gas.
[2]Capacity in grams SO₂ adsorbed per 100 grams of contained poly(N-glycidylpiperazine).
[3]Macroreticular ion exchange resin sold by Rohm and Haas Co. (polystyrene crosslinked with divinyl benzene).

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. Method of fabricating an article which adsorbs SO₂ from gas mixtures which comprises
   1. depositing on a support, having a high surface area, an oligomer having the structure:

$$\left[ H-N\begin{array}{c}CH_2-CH_2\\ \diagup\phantom{xxx}\diagdown\\ \phantom{xxx}(R)_a\\ \diagdown\phantom{xxx}\diagup\\ CH_2-CH_2\end{array}N-CH_2CH\!-\!\!CH_2\!\!-\!\!\!\underset{OH}{\phantom{x}}\right]_n$$

$$N\begin{array}{c}CH_2-CH_2\\ \diagup\phantom{xxx}\diagdown\\ \phantom{xxx}(R)_a\\ \diagdown\phantom{xxx}\diagup\\ CH_2-CH_2\end{array}N-CH_2CH\!-\!\!CH_2\atop\phantom{xxxxxxxx}\diagdown\!\!\diagup\atop\phantom{xxxxxxxxxx}O$$

wherein each R is a lower alkyl group having up to about 8 carbon atoms, $a$ is an integer having values of 0 to 4 and $n$ is an integer having values of about 2 to about 20; and
   2. heating the resultant combinatin of (1) above to room temperature until the oligomer is converted to a water-insoluble, crosslinked polymer.

2. Method claimed in claim 1 wherein $a$ is 0.
3. Method claimed in claim 1 wherein each R is methyl.
4. Method claimed in claim 3 wherein $a$ is 2.
5. Method claimed in claim 1 wherein the temperature in step (2) is about 100° to about 180° C.
6. Article suitable for the adsorption of SO₂ from gas mixtures fabricated by the method claimed in claim 2.
7. Article claimed in claim 6 wherein the support is a cellulosic substance.
8. Article claimed in claim 6 wherein the support is a polyurethane.
9. Article claimed in claim 6 wherein the support is a mixture of poly(ethylene oxide) and wood flour.
10. Article claimed in claim 6 wherein the support is silica.
11. Article claimed in claim 6 wherein the support is glass fiber.
12. Article claimed in claim 6 wherein the support is a plastic mesh screen.
13. Article claimed in claim 6 wherein the support is clay.
14. Article claimed in claim 6 wherein the support is a macroreticular polystyrene bead.
15. Article claimed in claim 6 wherein the support is polypropylene fiber.
16. Article claimed in claim 6 wherein the support is charcoal.
17. Article claimed in claim 6 wherein the support is gamma alumina.
18. Article claimed in claim 6 wherein the support is alpha alumina.
19. Article claimed in claim 6 wherein the support is chrysotile asbestos.
20. Article claimed in claim 6 wherein the support is chopped sisal.
21. Article claimed in claim 6 wherein the support is vermiculite.
22. Article claimed in claim 6 wherein the support is mordenite.
23. Article claimed in claim 6 wherein the support is diatomaceous earth.
24. Method of fabricating an article for the adsorption of SO₂ from gas streams which consists essentially of:
   1. immersing a support, having a high surface area, in an aqueous solution of an oligomer having the structure $$\left[ H-N\begin{array}{c}CH_2-CH_2\\ \diagup\phantom{xxx}\diagdown\\ \phantom{xxx}(R)_a\\ \diagdown\phantom{xxx}\diagup\\ CH_2-CH_2\end{array}N-CH_2CH\!-\!\!CH_2\!\!-\!\!\!\underset{OH}{\phantom{x}}\right]_n$$

$$N\begin{array}{c}CH_2-CH_2\\ \diagup\phantom{xxx}\diagdown\\ \phantom{xxx}(R)_a\\ \diagdown\phantom{xxx}\diagup\\ CH_2-CH_2\end{array}N-CH_2CH\!-\!\!CH_2\atop\phantom{xxxxxxxx}\diagdown\!\!\diagup\atop\phantom{xxxxxxxxxx}O$$

wherein each R is a lower alkyl group having up to about 8 carbon atoms, $a$ is an integer having values of 0 to 4 and $n$ is an integer having values of about 2 to about 20 whereby the support is wetted and impregnated with said solution;
   2. removing the support from the oligomer solution;

3. powder coating the support with porous, particles of a crosslinked, water-insoluble poly(N-glycidylpiperazine); and
4. heating the powder coated support until the water from the oligomer solution is evolved and the oligomer polymerizes.

25. Method claimed in claim 24 wherein the $a$ is 0 and $n = 4$.

26. Method claimed in claim 24 wherein the particles of crosslinked, water-insoluble poly(N-glycidylpiperazine) have a particle size of less than about 50 mesh.

27. Article for the adsorption of $SO_2$ from gas streams fabricated according to the method claimed in claim 24.

28. Article claimed in claim 27 wherein the support is paper.

29. Article claimed in claim 27 wherein the support is gamma alumina.

30. Article claimed in claim 27 wherein the support is alpha alumina.

* * * * *